Aug. 10, 1965   B. J. DEW   3,199,364
COMPOSITE PLASTIC GEAR
Filed Sept. 10, 1963   2 Sheets-Sheet 1

INVENTOR.
BRUCE J. DEW.
BY
D. Emmett Thompson
HIS ATTORNEY.

Aug. 10, 1965  B. J. DEW  3,199,364
COMPOSITE PLASTIC GEAR
Filed Sept. 10, 1963  2 Sheets-Sheet 2

INVENTOR.
BRUCE J. DEW.
BY
D. Emmett Thompson
HIS ATTORNEY.

United States Patent Office 3,199,364
Patented Aug. 10, 1965

3,199,364
COMPOSITE PLASTIC GEAR
Bruce J. Dew, Fayetteville, N.Y., assignor to Morse Chain Company, Ithaca, N.Y., a corporation
Filed Sept. 10, 1963, Ser. No. 307,900
3 Claims. (Cl. 74—460)

This invention relates to composite gears, sprockets, pulleys and the like, and particularly, to a composite gear, or the like, formed by injection molding of different plastic materials, the gear having no metal parts or inserts.

Heretofore, composite gears have been formed by molding a toothed rim of plastic material on the peripheral portion of a metallic core. Such composite gears have certain advantages in that they operate with less noise, to a degree are self-lubricating, and have good resistance to frictional wear. However, the metallic core is expensive to produce, requiring machining operations either before or after the molding of the toothed plastic rim thereon. Also, the metallic core does not have good dimensional stability under temperature change.

This invention has as an object a composite gear molded entirely of plastic materials, the gear being particularly economical to produce, is of less weight, has excellent stability under temperature change, and yet has great rigidity and high impact strength.

The invention has as a further object a composite gear having a core molded of thermosetting plastic material, having high tensile strength and rigidity, and a toothed rim portion of thermoplastic material molded on the peripheral portion of the core.

The invention has as a further object a composite gear comprising a core molded of thermosetting plastic material, a toothed rim portion of thermoplastic material molded on the core, and a bushing in the center bore hole of the core molded of the same thermoplastic material as the toothed rim.

The invention consists in the novel features and in the combinations and constructions hereinafter set forth and claimed.

In describing this invention, reference is had to the accompanying drawings in which like characters designate corresponding parts in all the views.

In the drawings—

Figure 6:
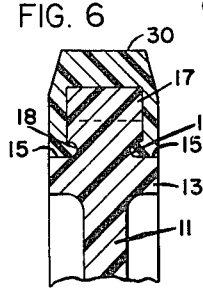
FIGURE 6 is an enlarged fragmentary sectional view taken on line 6—6, FIGURE 3.

The gear consists of a circular core member having a centrally located hub 10, which is encircled by a web portion 11. The web portion 11 is encircled by an annular portion 13 extending laterally in an axial direction from each side of the web 11. This portion 13 is encircled by an annular portion 14 dimensioned in an axial direction less than the portion 13 to provide circumferentially extending shoulders 15. The periphery of the portion 14 is formed with circumferentially spaced apart projections 17, as shown in dotted outline in FIGURE 1, and in full line, FIGURE 3. At the joinder of the portions 13, 14, the portion 14 is formed in its sides with circumferentially extending recesses 18, see FIGURES 2 and 6.

Figure 1:
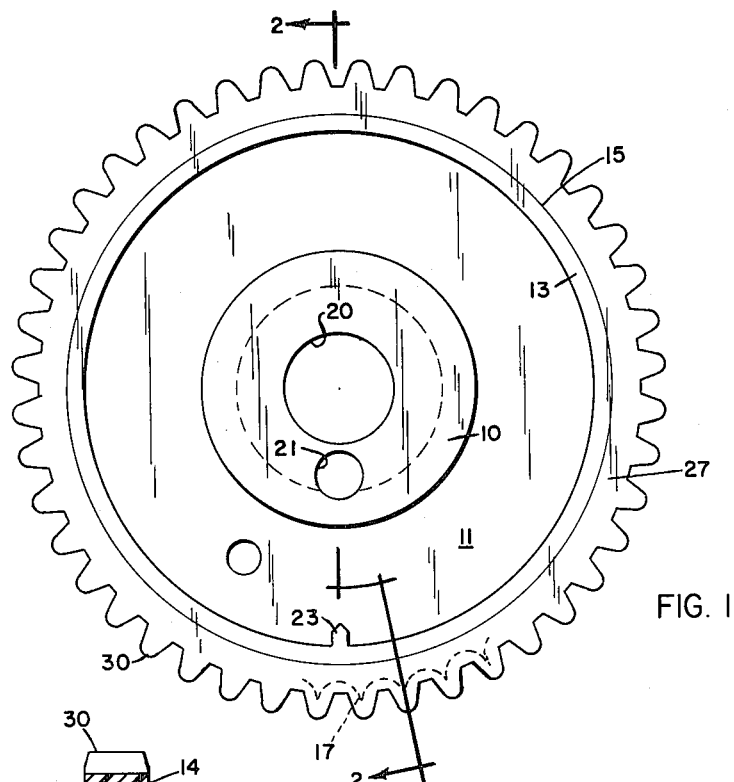
FIGURE 1 is a side elevational view of a composite gear embodying my invention.
Figure 2:
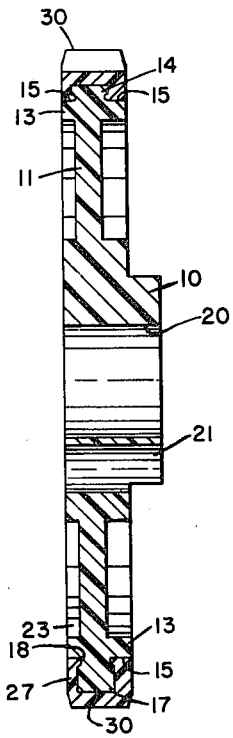
FIGURE 2 is a sectional view taken on line 2—2, FIGURE 1.
Figure 3:
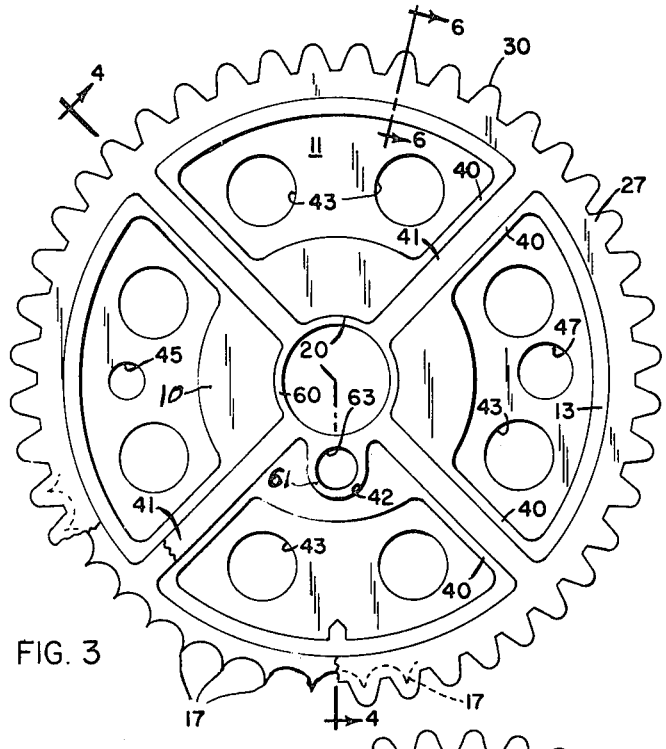
FIGURE 3 is a view similar to FIGURE 1 of a modified form of gear.

The hub portion 10 is formed with a centrally located bore hole 20 to provide for mounting the gear on a shaft, and, in FIGURES 1 and 2, the hub 10 is also formed with an aperture 21 spaced a slight distance radially outwardly from the bore hole 20. The aperture is provided to receive a driving pin fixedly secured to the shaft on which the gear is to be mounted. These gears are used extensively as timing gears for transmitting motion from the crank shaft to the cam shaft of internal combustion engines. The face side of the gear shown in FIGURES 1 and 3 is formed with a timing point or projection 23.

The core member described is formed by injection molding of thermosetting plastic material having low moisture absorption, good rigidity, and dimensional stability, and high impact strength, such as phenolic molding compounds possessing such characteristics and qualities.

A rim 27 of thermoplastic material is molded on the peripheral portion 14 of the core, and is formed with gear teeth 30. A thermoplastic material suitable for the molding of the toothed rim 27 is a nylon plastic having high fluidity at molding temperatures, whereby the molded part is of high quality and dimensional accuracy. It has a high melting point, high impact strength and self-lubricating qualities.

The spacing between the teeth, or projections 17 on the periphery of the core member is comparable to the spacing, or pitch of the gear teeth 30, whereby the teeth 17 serve to form an interlock between the core and the tooth rim 27 of the thermoplastic material, and the teeth 17 also serve to back up or support the gear teeth 30. The molded core member is positioned in a die cavity, the outer boundary of which is formed to produce the teeth 30. The die includes the core or plug members received by the central bore 20, and the locating aperture 21 to properly position the core member in the die, whereby when the thermoplastic material is forced into the die, the toothed rim 27 will be substantially concentric with the bore 20.

Figure 4:
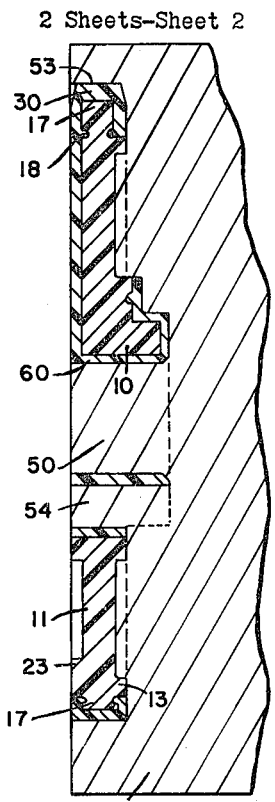
FIGURE 4 is a sectional view taken on line 4—4, FIGURE 3.
Figure 5:
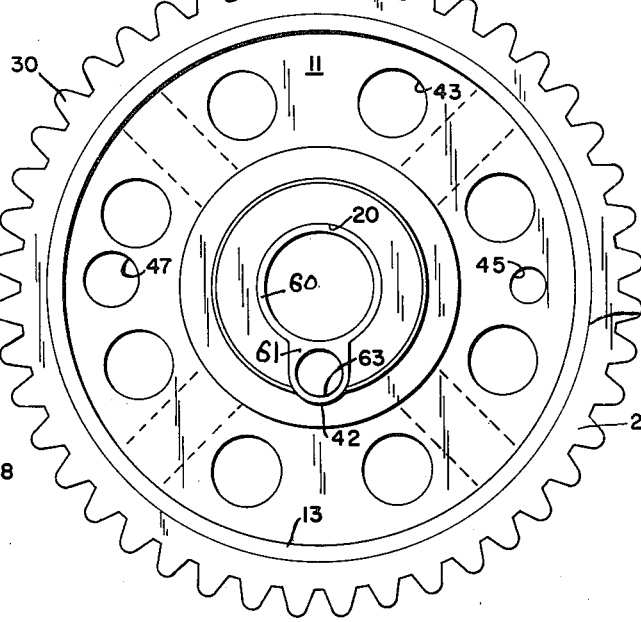
FIGURE 5 is a side elevational view of the side of the gear opposite to that shown in FIGURE 3.

In the form of the gear shown in FIGURES 3, 4 and 5, the core member embodies, in some areas, a different form. For example, one side surface of the web portion 11 of the core is formed with pairs of radially extending spaced apart ribs 40. These ribs extend radially from the hub 10 to the rim portion 13, and provide radially disposed channels 41 which extend inwardly from the shoulders 15, and continue through the hub 10, and communicate with the center bore hole 20. The hub 10 in this instance is formed with a U-shaped recess 42, extending radially outwardly from the central bore 20. The web may be also formed with apertures 43, spaced apart uniformly in a circumferential direction, and which serve to lighten the gear and conserve the thermosetting material.

The web 11 is also formed with locating apertures 45, 47, one of which, as 47, being of greater diameter than the other aperture. These apertures 45, 47 receive locating pins mounted in the die, in which the core is positioned for the molding of the toothed gear rim thereon.

This core member is positioned in a die 48, having a cavity of form complemental to the size and shape of the finished gear, this die being substantially the same in general arrangement as the die used in molding the toothed rim on the gear form shown in FIGURES 1 and 2. A plug 50 is mounted in the center of the die cavity coaxial with the outer boundary 53 of the die. The plug 50 has a diameter less than the diameter of the aperture 20 in the molded core. The die is also provided with a circular plug 54, which extends into the recess 42 of the core, and is located a slight distance radially outwardly from the plug 50. The diameter of the plug 54 is somewhat less than the diameter of the recess 42.

The die is also provided with a pair of locating pins, not shown, which are received in the locating apertures 45, 47, formed in the web of the core member. These pins serve to locate and maintain the core member with the bore 20 spaced from the plug 50, and with the plug 54 spaced from the sidewall of the recess 42. The projections 17 on the periphery of the core member are arranged in registration with the spaces between the projections extending inwardly from the outer boundary 53 of the die, and are spaced inwardly therefrom, whereby the projections 17 are located in registration with the molded teeth 30. The die is closed, and the thermoplastic material is forced into the die and flows into the annular space between the periphery of the core member, and the outer boundary 53 of the die cavity forming the toothed rim 27. As will be apparent, this rim encases the projections 17 and extends outwardly from the shoulders 15. The toothed rim is further interlocked with the core member by the thermoplastic material flowing into the circumferentially extending recesses 18.

The thermoplastic material also flows inwardly, through the channels 41, to the space between the bore 20 and the plug 50, and also into the space between the plug 54 and the recess 42, forming the bushing 60 with a portion 61 thereof extending into the recess 42.

Due to the fact that the plug 50 is located coaxial of the die cavity, it forms the bore of the thermoplastic bushing 60 in true concentricity with the gear teeth 30, whereby the bore hole in the bushing 60 does not have to be reamed, or otherwise machined to provide for a true running gear. In like manner, the locating bore 63 is formed in the radial portion 42 of the bushing in true relationship to the bore in the bushing 60, and to the toothed rim 27.

In both forms, it will be apparent the core member can be very economically molded from the thermosetting plastic material, and provides exceptional rigidity and strength to the gear. The thermoplastic toothed rim provides the necessary wear, resistance and quiet operation.

What I claim is:

1. A composite gear comprising a circular web of molded thermosetting plastic material, said web having a centrally located aperture, a toothed gear rim of thermoplastic material molded on the peripheral portion of said web, a bushing of thermoplastic material molded in said aperture, the bore of said bushing being concentric with said toothed rim, said toothed rim and bushing having parts interlocking with said web.

2. A composite gear as defined in claim 1, wherein said web is formed with radially disposed channels extending from said bushing to said toothed rim for the reception of said thermoplastic material.

3. A composite gear comprising a core including integral hub and web portions moulded of thermosetting material, said web portion being encircled by an annular rim having a peripheral portion formed with circumferentially spaced apart projections, said rim extending laterally from opposite sides of said peripheral portion to provide a circumferentially extending shoulder at each side of said peripheral portion, said peripheral portion being formed on opposite sides contiguous to said shoulders with a circumferentially extending groove, and a toothed rim of thermoplastic material moulded on said peripheral portion and being interlocked with said projections and said grooves, the sides of said toothed rim being flush with the sides of said annular rim.

References Cited by the Examiner

UNITED STATES PATENTS

| 2,720,119 | 10/55 | Sherman | 74—460 |
| 2,839,943 | 6/58 | Caldwell et al. | 74—434 |

DON A. WAITE, *Primary Examiner.*